United States Patent [19]

Nagai et al.

[11] Patent Number: 4,957,710

[45] Date of Patent: Sep. 18, 1990

[54] CATALYTIC COMBUSTION TYPE EXHAUST GAS PROCESSING DEVICE AND DRYING FURNACE FOR USE IN COATING UTILIZING THE SAME

[75] Inventors: Teizi Nagai; Yasuo Tokushima; Sadao Kubota, all of Toyota; Kenichirou Suzuki, Aichi; Yoshiyasu Fujitani, Nagoya; Taisuke Yoshimoto, Nagoya; Hideaki Muraki, Nagoya; Hideo Tachi, Aichi, all of Japan

[73] Assignees: Toyota Motor Corporation, Toyota; Kabushiki Kaisha Toyota Chou Kenkyusho, Aichi; Trinity Industrial Corp., Tokyo, all of Japan

[21] Appl. No.: 175,671

[22] Filed: Mar. 25, 1988

Related U.S. Application Data

[63] Continuation of Ser. No. 817,722, Jan. 10, 1986, abandoned.

[30] Foreign Application Priority Data

Jan. 11, 1985 [JP] Japan .................................. 60-1503
Jan. 11, 1985 [JP] Japan .................................. 60-1504
Jan. 11, 1985 [JP] Japan .................................. 60-1505

[51] Int. Cl.$^5$ .......................... B01J 8/04; B01J 23/00; B01J 23/42; B01J 23/44
[52] U.S. Cl. ......................................... 422/171; 34/79; 422/177; 422/180; 422/191; 422/193; 422/211; 422/222; 502/304; 502/339
[58] Field of Search ............... 422/170, 171, 177, 180, 422/191, 193, 211, 222, 172; 502/304, 339; 34/79

[56] References Cited

U.S. PATENT DOCUMENTS

| | | | |
|---|---|---|---|
| 3,259,453 | 7/1966 | Stiles | 422/177 |
| 3,599,427 | 8/1971 | Jones et al. | 422/171 |
| 3,656,915 | 4/1972 | Tourtellotte | 422/172 |
| 3,910,770 | 10/1975 | Kobylinski et al. | 422/172 |
| 4,054,418 | 10/1977 | Miller et al. | 422/171 |
| 4,082,514 | 4/1978 | Torres | 422/177 |
| 4,225,561 | 9/1980 | Torres | 422/171 |
| 4,255,173 | 3/1981 | Mayer et al. | 422/177 |
| 4,270,896 | 6/1981 | Polinski et al. | 422/171 |
| 4,403,948 | 9/1983 | Waldmann et al. | 34/79 |
| 4,492,770 | 1/1985 | Blanchard et al. | 502/304 |

FOREIGN PATENT DOCUMENTS

| | | | |
|---|---|---|---|
| 2825306 | 12/1979 | Fed. Rep. of Germany | 422/170 |
| 5925 | 3/1966 | Japan | 422/193 |
| 175785 | 10/1983 | Japan . | |
| 691181 | 10/1979 | U.S.S.R. | 422/171 |

Primary Examiner—Robert J. Warden
Assistant Examiner—Jill Johnston
Attorney, Agent, or Firm—Cushman, Darby & Cushman

[57] ABSTRACT

A catalytic combustion type exhaust gas processing device wherein noxious/smelly components contained in exhaust gases are deodorized and purified through sequential oxidative decomposition by at least one catalyst layer composed of platinum and/or palladium catalyst and a copper-cerium catalyst comprising chemically active species of copper and cerium in a compounded form. The device can be applied effectively to a drying furnace, for example, used in a coating for automobile use.

8 Claims, 3 Drawing Sheets

CATALYTIC COMBUSTION TYPE EXHAUST GAS PROCESSING DEVICE AND DRYING FURNACE FOR USE IN COATING UTILIZING THE SAME

This is a continuation of application Ser. No. 817,722, filed Jan. 10, 1986, which was abandoned upon the filing hereof.

BACKGROUND OF THE INVENTION

1. Field of the Invention

This invention concerns a catalytic combustion-type exhaust gas processing device for deodorizing and purifying noxious/smelly components contained in exhaust gases through oxidative decomposition in a series of catalyst layers, as well as a coating drying furnace that utilizes such a catalytic exhaust gas combustion device.

2. Description or the Prior Art

In those facilities such as drying furnaces for use in coating and printing, manufacturing apparatus for plastics or plywoods, food processing facilities, industrial wastes processing facilities and facilities for manufacturing fire extinguishing agents or perfumes, which use paints, inks, solvents, adhesives, synthetic resins or chemical agents, noxious/smelly components such as alcohols or esters and phenols or aldehydes which are noxious and have peculiar odors are produced tending to deteriorate the air quality of the workplace.

Therefore, it has been required to discharge such exhaust gases containing noxious/smelly components out of the facilities, but it has been prohibited to release them directly to the atmosphere, in view of the desire for prevention of pollution. Accordingly, the exhaust gases have usually been deodorized and purified by being passed through a catalytic combustion-type exhaust gas processing device and discharged after the noxious/smelly components are finally decomposed oxidatively into non-toxic and odorless gaseous carbon dioxide and water.

As the catalyst for constituting the catalyst layer in the exhaust gas processing device, various catalysts such as platinum, palladium, cobalt oxide and manganese oxide have been used. Among them, those catalysts comprising platinum group metals such as platinum (Pt), palladium (Pd) and a platinum-palladium mixture (hereinafter collectively referred to as a platinum-type catalyst) have been used generally since they have an extremely high oxidizing activity and are thermally stable.

However, although a platinum-type catalyst can promote the dehydrogenating reaction of phenols or alcohols and effectively produce aldehydes, it has been confirmed experimentally that even such platinum-type catalysts are poor in the performance of further converting the aldehydes into carboxylic acids and finally decomposing them into non-toxic and odorless, gaseous carbon dioxide and water. Accordingly, exhaust gases deodorized in an exhaust gas processing device having a catalyst layer composed only of a platinum-type catalyst contain a great amount of aldehydes as the intermediate products of the catalytic oxidation, which causes atmospheric pollution.

Further, in a drying furnace for use in coating adapted, for example, for baking or drying automobile bodies, since the inside of the furnace is usually heated to such a high temperature (to about 170° to 180° C.) for reacting to harden the paint films, noxious/smelly components such as organic solvents, for example, thinner and toluene, curing agents or paint resins are evaporated from the paint films. When the concentration of the noxious/smelly components in the furnace is increased, it causes yellowing and defective drying of the paint films, thereby lowering the quality of products and worsening the working circumstances. Accordingly, the exhaust gases in the furnace have also been deodorized and purified in a catalytic combustion-type exhaust gas processing device and then discharged into the atmosphere.

Since the gases deodorized and purified by passing through a catalyst layer of an exhaust gas processing device are heated to a high temperature of about 300° to 500° C., which is the reaction temperature of the catalyst, there has recently been proposed a technology for effectively utilizing the processed gases as a heat source for the inside of the furnace by recycling them into the furnace again without releasing them directly to the atmosphere, for example as described in Japanese Patent Publication Nos. 175785/1983 and 12946/1984.

However, since a platinum-type catalyst has been used for the catalyst layer in the exhaust gas processing device of this kind, processed gases recycled through the furnace contain a great amount of aldehydes, and it has been experimentally found by the present inventors that the concentration of oxo compounds or the like having aldehyde groups in the furnace is increased, to produce a great amount or tarry or resinous substances that cause yellowing or inter-layer defoliation of the paint films.

SUMMARY OF THE INVENTION

It is, accordingly, an object of this invention to provide a catalytic combustion-type exhaust gas processing device having a series of different catalyst layers together capable of promoting the dehydrogenation of noxious/smelly components contained in exhaust gases and effectively decomposing them oxidatively into aldehydes, further, effectively converting the aldehydes through oxidation into carboxylic acids and, further, oxidatively decomposing them finally into non-toxic and odorless gaseous carbon dioxide and water.

Another object of this invention is to provide a coating drying furnace that utilizes the novel exhaust gas processing device, capable of suppressing the formation of tarry or resinous substances in the exhaust gases which are discharged from the drying furnace and then recycled again into the furnace, in order to surely prevent the yellowing or inter-layer defoliation of the paint films.

The foregoing objects of this invention can be attained in accordance with the principles of this invention by catalytic combustion-type exhaust gas processing device comprising a series of catalyst layers for deodorizing and purifying noxious/smelly components contained in exhaust gases through oxidative decomposition, in which the catalyst layers are composed of a platinum-type catalyst comprising at least one platinum group metal ranked before a copper-cerium catalyst comprising chemically active copper and cerium in a compounded form.

Another object can be attained in accordance with this invention by a coating drying furnace comprising a catalytic combustion type exhaust gas processing device having a series of catalyst layers for deodorizing and purifying noxious/smelly components formed in a drying furnace, in which the catalyst layers are composed of a platinum-type catalyst comprising at least one platinum group metal and a copper-cerium catalyst comprising chemically active copper and cerium in a compounded form.

In the exhaust gas processing device according to this invention, since the noxious/smelly components in the exhaust gases passed through the catalyst layer are decomposed through dehydrogenation into aldehydes by the aid of the platinum-type catalyst having a high oxidizing activity and the thus-decomposed aldehydes are effectively decomposed oxidatively by way of carboxylic acids and finally into non-toxic/smelly gaseous carbon dioxide and water through the substantially complete oxidation by the aid of the copper-cerium catalyst, the concentration of the aldehydes in the gases processed by passing through the catalyst layer is remarkably reduced.

Further, in the drying furnace for use in coating according to this invention, if the noxious/smelly components in the exhaust gases discharged from the furnace are effectively decomposed in the exhaust gas processing device as described above and then recycled through the furnace as a clean hot flow at an extremely low aldehyde concentration, formation of the tarry or resinous substances in the furnace can be suppressed.

BRIEF DESCRIPTIONS OF THE ACCOMPANYING DRAWINGS

These and other objects, features, as well as advantageous effects of this invention will become clearer by reading the following description of the preferred embodiments of this invention made in conjunction with the appended drawings, wherein.

DESCRIPTION OF PREFERRED EMBODIMENTS

Figure 1:
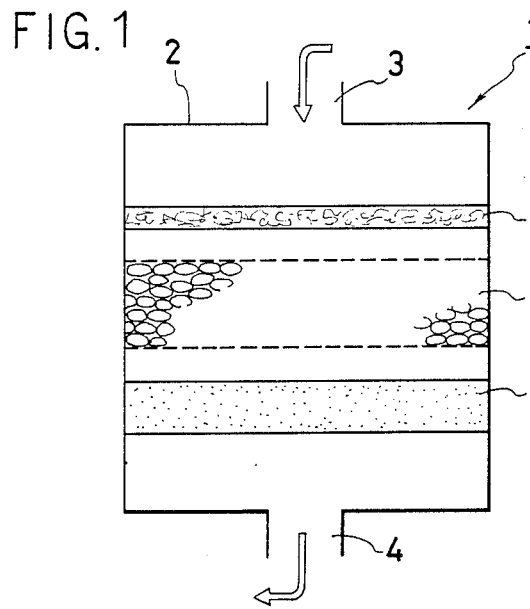
FIG. 1 is a longitudinal cross-sectional view for one embodiment of a catalytic combustion-type exhaust gas processing device according to this invention.

This invention will now be described specifically more in detail by way of preferred embodiments shown in the drawings.

EXAMPLE 1

FIG. 1 shows a longitudinal cross-section for one embodiment of a catalytic combustion-type exhaust gas processing device according to this invention.

The exhaust gas processing device 1 comprises a reactor 2 and a series of catalyst layers 5 disposed therein between an inlet 3 and an exit 4 thereof. The series of catalyst layers 5 is constituted by (in this embodiment) a platinum-palladium catalyst 5a carried on a support made of heat resistant fibers, another platinum-palladium catalyst 5b carried on a support made of pellets and a copper-cerium catalyst 5c carried on a porous ceramic support, ranked in the order just described, from the inlet 3 to the exit 4.

In this embodiment, the catalyst 5a carried on the support made of heat resistant fibers is disposed nearest the inlet 3 of the reactor 2, so that solid particles such as dust contained in exhaust gases or obstacles produced through incomplete combustion of noxious/smelly components may not deposit on the pellet-like catalyst 5b nor on the porous ceramics catalyst 5c and, by doing so, increase the pressure drop or degrade the catalysts 5b and 5c to impair the catalyst life.

Further, the platinum-type catalysts, i.e., the catalyst 5a and the catalyst 5b of the same platinum-palladium combination are cascaded in this embodiment, so that the dehydrogenation for the components contained in the exhaust gases may be effectively promoted further. Furthermore, pellets of a higher heat conductivity are used as the support for the catalyst 5b, so that the heat of reaction can be removed with ease to prevent the degradation in the oxidizing activity and the selectivity due to overheating of the catalyst 5b being put between the catalysts 5a and 5c, thereby promoting the catalyst life.

Furthermore, the copper-cerium catalyst 5c comprising chemically active species of copper and cerium in the compounded form is carried on a porous ceramic support, because the porous ceramic support can carry the copper-ceramic type catalyst more easily, as compared with a heat-resistant fiber support for this catalyst, and it results in a lower pressure drop as compared with other supports known at present. Although it is possible to carry the copper-cerium catalyst on pellets, since the pellets cause a greater pressure drop, it is not preferred to dispose a Cu-Ce pellet-like catalyst in cascade succeeding to the catalyst 5b.

The operation of the first embodiment of a coating drying furnace using the exhaust gas processing device according to this invention will now be explained referring to FIG. 2.

Figure 2:
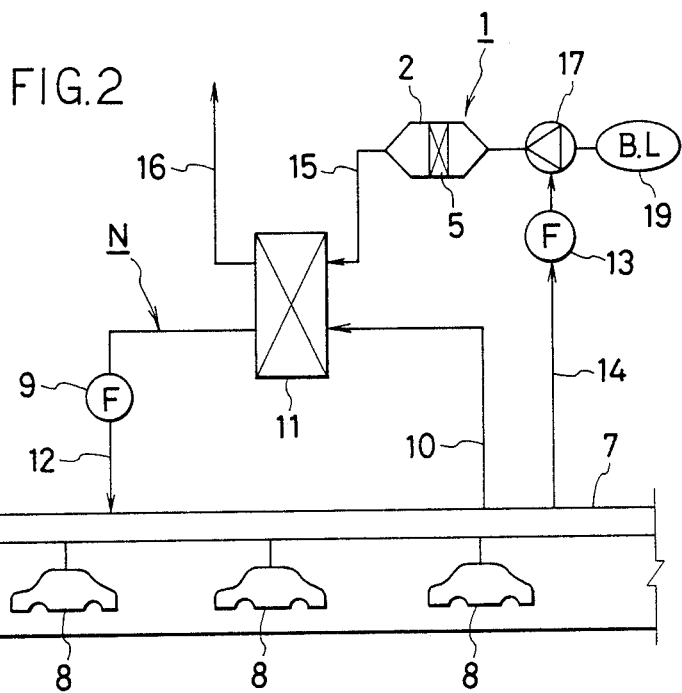
FIG. 2 is a flow sheet of one embodiment of a coating drying furnace using the exhaust gas processing device of this invention.

The coating drying furnace of FIG. 2 is designed such that automobile bodies 8, 8, etc. are continuously conveyed to the inside of a reactor main body 7, and heated therein to a high temperature of about 170° to 180° C. for baking to dry paint films thereon.

A hot gas flow recycling path N is disposed for recycling a hot gas flow through the furnace main body 7 by way of a recycling blower 9 and it is adapted so as to feed air in the furnace sucked (i.e. drawn) from a return duct 10 into a heat exchanger 11, and to introduce hot air heated through heat exchange in the heat exchanger 11 into the furnace main body 7 again by way of a supply duct 12.

Exhaust gases containing noxious/smelly components produced in the furnace main body 7 upon heating the paint films on the automobile bodies 8, 8, etc. are sucked and discharged at an exhaust duct 14 by way of the suction blower 13, supplied to the exhaust gas processing device 1 according to this invention, deodorized and cleaned by being passed through the series of catalyst layers 5 disposed in the reactor 2, sent by way of the duct 15 into finned tubes of the heat exchanger 11 and then discharged to the atmosphere by way of the duct 16 after causing heat to release from the fins or the tubes to thereby heat the airs in the furnace flowing through the hot gas flow recycling path N.

The catalyst layer disposed in the reactor 2 of the exhaust gas processing device 1 is heated to about 300°–500° C., which is a reaction temperature of the catalyst, by a heater 17 such as a burner. When the exhaust gases containing the noxious/smelly components such as phenols or alcohols are supplied from the inlet 3 of the reactor 2 and passed through the catalyst layer 5, the solid particles such as dust contained in the exhaust gases discharged from the inside of the furnace main body 7 are at first removed by the filtering effect of the catalyst 5a carried on the respective heat-resistant fiber support and, simultaneously, the catalyst 5a together with the catalyst 5b, which is disposed just downstream thereof and carried on the respective pellet support, effectively promote dehydrogenation to oxidatively decompose the noxious/smelly components, i.e., phenols or alcohols into aldehydes.

Then, the copper-cerium catalyst 5c, carried on the respective porous ceramic support, effectively promotes the oxidation of the thus-formed aldehydes and finally decomposes them through carboxylic acids into non-toxic and odorless gaseous carbon dioxide and water.

Since clean, deodorized gases at an extremely low aldehyde concentration are discharged from the exit 4 of the reactor 2 and they have served for the effective utilization of the waste heat by way of the heat exchanger 11 and are then discharged through the duct 16 to the atmosphere, it is possible to surely prevent atmospheric pollution by the exhaust gases.

Particularly, atmospheric pollution can significantly be reduced by the structure in this embodiment wherein the platinum-palladium type catalysts 5a, 5b having high oxidizing activity and capable of effectively promoting the dehydrogenation of the noxious/smelly components into aldehydes are disposed in cascade, i.e. sequentially, and the copper-cerium catalyst 5c capable of effectively promoting the oxidation of the aldehydes into nontoxic and odorless gaseous carbon dioxide and water is provided as a subsequent layer in the sequence.

Furthermore, since the catalyst 5a carried on a support made of heat-resistant fibers having a filtering effect is disposed nearer the inlet 3 of the reactor 2 to which the exhaust gases are fed, dust or the like in the exhaust gases is removed through the catalyst 5a to prevent clogging in the catalyst 5b carried on the pellet support and the copper-cerium catalyst 5c carried on the porous ceramic support disposed downstream thereof. Therefore, the entire pressure drop of the catalyst layer 5 and wearing degradation in the catalysts 5b and 5c can surely be prevented, thus remarkably increasing the catalyst life.

Furthermore, since the catalyst 5b put between the catalyst 5a and the catalyst 5c is carried on a pellet-like support with a smaller surface area in this embodiment, the heat of reaction can easily be removed from the catalyst 5b to suppress the degradation due to overheating in the oxidizing activity and the selectivity, by which the catalyst life can be improved also in this regard. In addition, if a porous ceramic member with a small pressure drop is used as the support for the copper-cerium catalyst 5c disposed as the final stage in this embodiment, the use of the pellet-like support with a relatively large pressure drop is enabled for the catalyst 5b which is put between the catalyst 5c and the catalyst 5a and likely to undergo overheating.

As described above, the exhaust gas processing device 1 can effectively remove the aldehyde components in the exhaust gases discharged from the various facilities such as a coating-drying furnace thereby preventing the atmospheric pollution.

Figure 5:
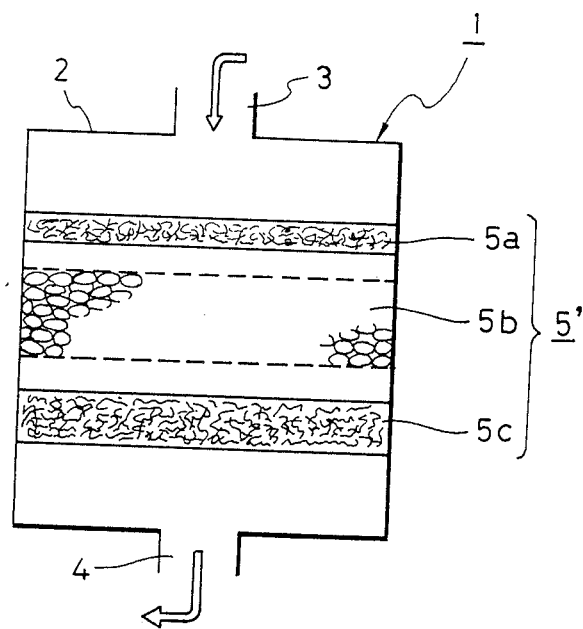
FIG. 5 is a longitudinal cross-sectional view, similar to FIG. 1, of a variation of the device.

Although the catalyst 5b is put between the catalysts 5a and 5c in the embodiment of the exhaust gas processing device illustrated in FIG. 1, the catalyst 5b may be omitted in this invention. In addition, the copper-cerium catalyst 5c may be carried on other supports than a porous ceramic support; for instance, it may be carried on a heat-resistant fiber support as is illustrated for the catalyst series 5' at 5c' in FIG. 5.

EXAMPLE 2

Figure 3:
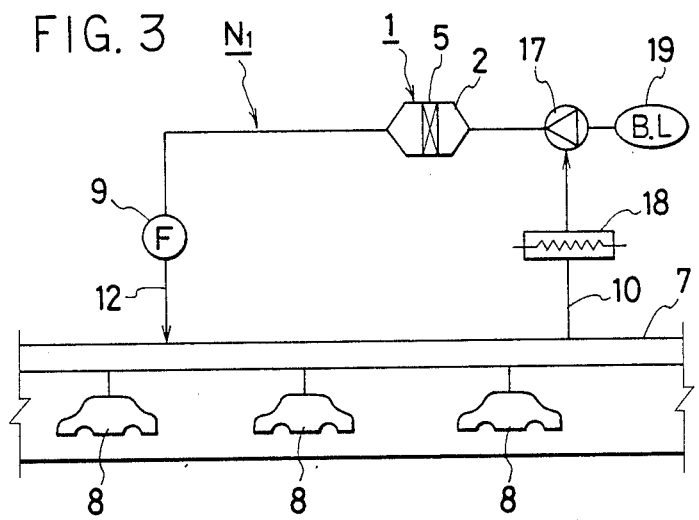
FIGS. 3 and 4 are, respectively, flow sheets of, respectively, second and third embodiments of the coating drying furnace according to this invention.

FIG. 3 shows a flow sheet illustrating a second embodiment of a coating drying furnace according to this invention.

In the drawing, a hot gas flow recycling path $N_1$ comprises a return duct 10 for sucking to discharge exhaust gases containing noxious/smelly components produced in a furnace main body 7 and supplying them to a catalytic combustion type exhaust gas processing device 1 as shown in FIG. 1 and a supply duct 12 for directly recycling processed gases at high temperature cleaned by oxidation in the exhaust gas processing device 1 directly to the inside of the furnace main body, in which a dust filter 18 and a recycling blower 9 are provided for the return duct 10 and the supply duct 12 respectively.

The exhaust gas processing device 1 disposed intermediate the ends of the hot flow recycling path $N_1$ is adapted to heat the catalyst layer 5 in the reactor 2 to about 300°–500° C. by using a burner 17 as a heater. Further, the series of catalyst layers 5 has a structure comprising a platinum-type catalyst comprising platinum and/or palladium ranked before a copper-cerium catalyst comprising chemically active copper and cerium in a compounded form.

The operation the FIG. 3 embodiment of the coating drying furnace in accordance with this invention will now be explained.

At first, the inside of the furnace main body 7 is preheated, air and relatively clean fuel such as city gas or liquified propane gas are supplied from a blower 19 to a burner 17 to produce gases, which are recycled through a recycling blower 9 disposed at the midway of the supply duct 12 to the inside of the furnace main body 7 to heat the inside to a predetermined temperature.

Then, when the inside of the furnace main body 7 reaches a predetermined temperature, for example, from 170° to 180° C., automobile bodies 8, 8, etc., as coated objects, are continuously conveyed to the inside of the furnace main body 7 where paint films are baked and dried.

In this case, noxious/smelly components such as phenols, thinner and toluene are evaporated from the paint films on the respective automobile bodies 8 heated to a high temperature in the furnace main body 7 to contaminate the hot gas in the furnace. The contaminated hot gas in the furnace is sucked to discharge from the return duct 10 as exhaust gases, which are removed with dust through the dust-filter 18 and then supplied to the exhaust gas processing device 1.

The exhaust gas processing device 1 includes a series of catalyst layers 5 having a platinum-type catalyst capable of effectively promoting the dehydrogenation for converting the noxious/smelly components in the exhaust gases into aldehydes ranked before a copper-cerium catalyst capable of effectively promoting the oxidation of finally decomposing oxidatively the thus formed aldehydes by way of carboxylic acids into nontoxic and odorless gaseous carbon dioxide and water, whereby the noxious/smelly components in the exhaust gases sucked to discharge from the return duct 10 are oxidatively decomposed substantially completely to reduce the amount of unreacted aldehydes that form tar-like or resinous substances causing the yellowing and inter-layer defoliation of the paint films as compared with usual case.

Further, since the catalyst layer 5 is heated to the catalytic reaction temperature from 300° to 500° C. (usually about 400° C.), by the burner 17, the exhaust gases deodorized and purified in the catalyst layer and purified in the catalyst layer 5 are recycled again in the furnace main body 7 through the supply duct 12 in the form of a clean processed gases heated to a sufficient temperature to heat the inside of the furnace main body 7.

As described above, in the coating drying furnace in accordance with this invention, since the concentration of the aldehydes in the processed gases recycled through in the furnace main body 7 is extremely low, formation of tar-like substances causing the yellowing or inter-layer defoliation in the paint films can be suppressed to significantly improve the coating quality, which is extremely useful for the automobile coating for which an especially high quality coating is demanded.

Figure 4:
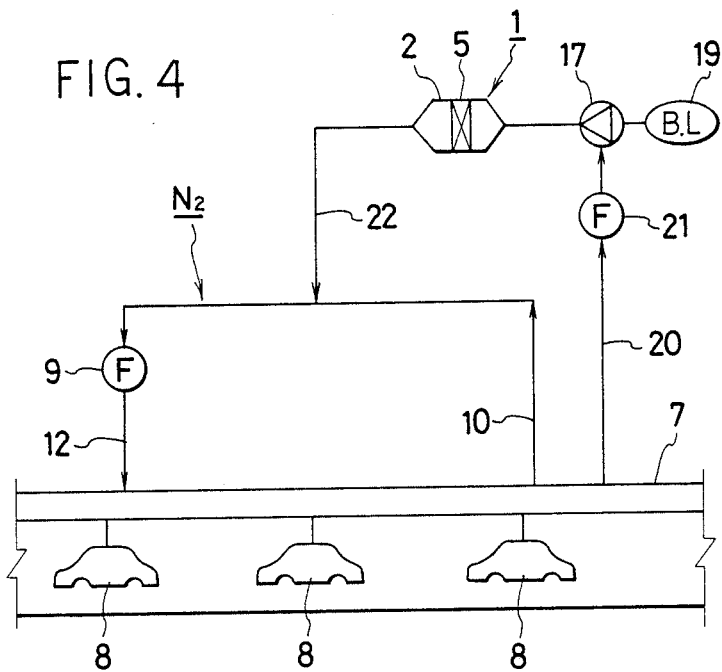

Although the descriptions have been made in the above embodiment to a drying furnace for use in coating in which the exhaust gas processing device 1 is disposed at the midway of the hot flow recycling path $N_1$, this invention is no way limited to such a construction. For instance, as shown in FIG. 4, the drying furnace may be designed such that exhaust gases sucked by a recycling fan 21 provided in an exhaust duct 20 are supplied to and odorized and purified in the exhaust gas processing device 1, the processed gases are introduced by way of a connection duct 22 into a hot blow recycling path $N_2$ and airs in the furnace sucked by a recycling blower 9 disposed intermediate the ends of the hot flow recycling path $N_2$ are heated and recycled through the supply duct 12 to the inside of the furnace main body 7. Further, if an auxiliary burner for temperature control (not illustrated) is disposed intermediate the ends of the hot flow recycling path $N_2$ in FIG. 4, the airs in the furnace sucked from the return duct 10 of the hot flow recycling path $N_2$ can be heated to a predetermined temperature within a short time, and the temperature in the inside can always be maintained constant by variably controlling the heat of combustion in the auxiliary burner even in a case where the temperature inside the furnace main body 7 varies due to the increase/decrease of the number or amount of the automobile bodies 8 conveyed into the furnace main body 7.

As described above, the exhaust gas processing device according to this invention has a advantageous effect of remarkably reducing atmospheric pollution or the like as compared with the conventional device, since exhaust gases containing the noxious/smelly components are passed through a series of catalyst layers including a platinum-type catalyst capable of effectively promoting the dehydrogenation ranked in sequence before a copper-cerium catalyst capable of effectively promoting the oxidation for oxidatively decomposing the aldehydes formed through the dehydrogenation through carboxylic acids finally into non-toxic and odorless gaseous carbon dioxide and water, and the concentration of the aldehydes as the intermediate products of the catalytic oxidative reaction in the processed gases is extremely lowered.

Furthermore, the coating drying furnace according to this invention has an excellent effect, in that the concentration or the aldehydes in the processed gases supplied to the inside of the furnace is significantly reduced as compared with the conventional drying furnace of this type and the formation of the tar-like or resinous substances causing yellowing or inter-layer defoliation of the paint films is suppressed to significantly improve the coating quality, since the exhaust gases containing the noxious/smelly components generated in the furnace are deodorized and purified in the exhaust gas processing device as described above and then, in some embodiments, recycled to the drying furnace.

What is claimed is:

1. A catalytic combustion-type processing device for exhaust gas discharged from a furnace for heating and drying a coating on an object and which exhaust gas contains volatile noxious/smelly components, said device comprising:

a catalytic reactor housing comprising wall means defining a chamber having an inlet and an outlet for a gas stream following in a direction along a path;

a first catalyst layer disposed in said chamber for dehydrogenating into aldehydes noxious/smelly components contained in a gas stream, said first catalyst layer comprising, in sequence along said path, a first sub-layer and a second sub-layer, each said sub-layer comprising at least one platinum group metal selected rom the group consisting of platinum, palladium, and mixtures thereof, said at least one platinum group metal being carried on a support; said support, in said first sub-layer being made of heat-resistant fibers; and a second catalyst layer disposed in said chamber downstream of said second sub-layer of said first catalyst layer, said second catalyst layer comprising a copper-cerium compound carried on a support, for oxidatively decomposing said aldehydes and thereby effectively decomposing noxious/smelly components.

2. The catalytic combustion-type exhaust gas processing device of claim 1, wherein:

said support for said second catalyst layer is made of porous ceramic material.

3. The catalytic combustion-type exhaust gas-processing device of claim 1, wherein:

said support for said second catalyst layer is made of heat resistant fibers.

4. The catalytic combustion-type exhaust gas-processing device of claim 1, wherein:

said support for said second sub-layer of said first layer being one which is made of pellets, and said support for said second layer being made of porous ceramic material.

5. A furnace for heating and drying a coating on an object, comprising:

an enclosure for receiving an object having a coating which is to be heated and dried;

a recycle loop communicated both at a return duct end thereof and at a supply duct end thereof with said enclosure and incorporating a means for heating in said recycle loop a gas stream being recycled from and to said enclosure, and a catalytic combustion-type processing device for exhaust gas discharged from said furnace and which exhaust gas contains volatile noxious or smelly components, said device comprising:

a catalytic combustion-type exhaust gas-processing device, comprising:

a catalytic reactor housing comprising wall means defining a chamber having an inlet and an outlet for a gas stream flowing in a direction along a path;

a first catalyst layer and a second catalyst layer, disposed in said chamber, for being sequentially contacted by said gas stream when flowing in said direction along said path;

said first catalyst layer being disposed for dehydrogenating into aldehydes noxious or smelly components contained in said gas stream, said first catalyst layer comprising, in sequence along said path, a first sub-layer and a second sub-layer, each said sub-layer comprising at least one platinum group metal selected from the group consisting of platinum, palladium, and mixtures thereof, said at least one platinum group metal being carried on a support; said support, in said first sub-layer being made of heat resistant fibers; and said second catalyst layer being disposed for oxidatively decomposing said aldehydes and comprising a quantum of chemically active copper, and cerium, in the form of a copper-cerium compound, disposed on a second support;

said inlet of said chamber being in communication via duct means with said enclosure and adapted to receive through said duct means a gas stream withdrawn from said chamber for passage along said path, whereby this gas stream is processed in said chamber and, after being processed, passes therefrom through said outlet of said chamber.

6. The furnace of claim 5, wherein:
said heating means comprises a heat exchanger, a heater positioned and arranged to heat a gas stream in said duct means, a duct to atmosphere connected to said outlet of said chamber, and said recycle loop, intermediate said ends thereof, and said duct to atmosphere being disposed in indirect heat exchange relation through said heat exchanger.

7. The furnace of claim 5, wherein:
said chamber of said catalytic reactor housing is interposed in said recycle loop, intermediate said ends of said recycle loop, with a corresponding part of said recycle loop providing a portion of said duct means; and said heating means comprises a heater interposed in said recycle loop, intermediate said chamber of said catalytic reactor, and said return duct end of said recycle loop.

8. The furnace of claim 5, wherein:
said heating means comprises a heater for heating a gas stream in said duct means, and a duct connecting said outlet of said chamber with said recycle loop, intermediate said ends thereof.

* * * * *